G. E. WHITMORE.
Hub.
No. 65,521.
Patented June 4, 1867.
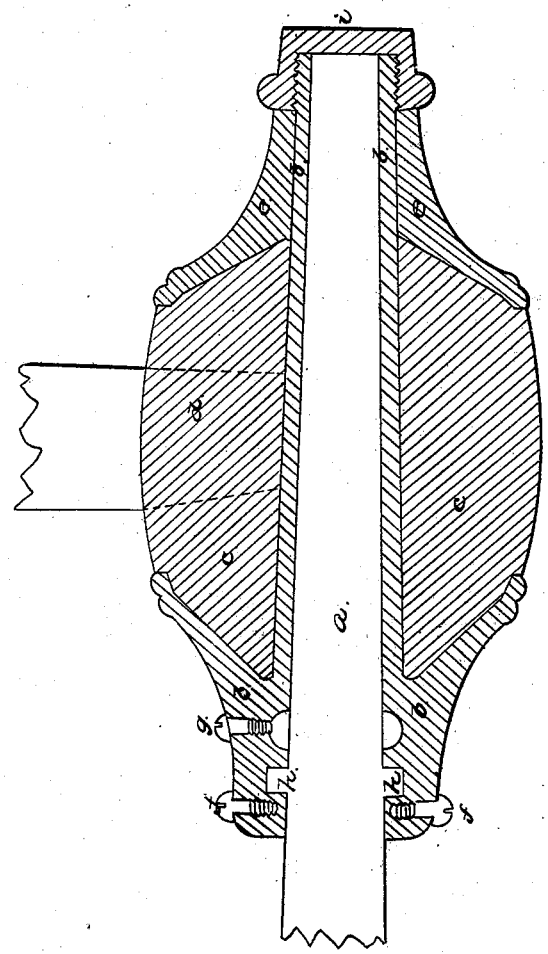
Witnesses.
A. D. Whitmore
E. S. Pixley
Inventor.
Geo. E. Whitmore

United States Patent Office.

GEORGE E. WHITMORE, OF HOUSATONIC, MASSACHUSETTS.

Letters Patent No. 65,521, dated June 4, 1867.

IMPROVEMENT IN HUBS FOR WHEELS.

*The Schedule referred to in these Letters Patent and making part of the same.*

TO ALL WHOM IT MAY CONCERN:

Be it known that I, GEORGE E. WHITMORE, of Housatonic, in the county of Berkshire, State of Massachusetts, have invented a new and useful improvement in the Hubs and Boxes for Wagon-Wheels; and I do hereby declare that the following is a full description.

The object of my improvement is to combine the elasticity of a wooden with the strength of an iron hub; and to attain it I make the box $a\ a\ a\ a$ a part of the hub, and on one end either cast or securely fasten a flange, $b\ b$, which may be of such shape and size as it is desirable to have the hub, and so constructed as to encase a portion of the wooden parts of the hub $c\ c\ c\ c$. A similar flange, $d\ d$, is fitted to the other end of the box, and held firmly against the wooden parts $c\ c$ by a screw, $e$, or other equivalent. The wooden part $c\ c$, when nicely fitted to the flanges on either end, is so secured endwise and to its circumference as to endure the hardest driving of the spoke. The wooden part is of such length as will permit the mortise $f$ to be beaten and the spoke $g$ to be driven as in the common wooden hub. The hub is held upon the axle by a ring, $h\ h$, secured to the hub by the screws $k\ k$, and working back of the fast collar $i\ i$. Oil is introduced into the hub through a hole closed by the screw $l$, or it may be held on by a nut on the outer end of the axle.

What I claim as my invention, and desire to secure by Letters Patent, is—

The combination, by which the wooden part of the hub is encased and supported at both ends and on its periphery by the iron flanges, enabling the wheel-maker to drive the spoke firmly into the smallest hub, and thus attaining the desired qualifications of elasticity and strength.

GEO. E. WHITMORE.

Witnesses:
    E. S. PIXLEY,
    A. D. WHITMORE.